United States Patent
Waas et al.

(10) Patent No.: US 10,628,438 B2
(45) Date of Patent: *Apr. 21, 2020

(54) METHOD AND SYSTEM FOR TRANSPARENT INTEROPERABILITY BETWEEN APPLICATIONS AND DATA MANAGEMENT SYSTEMS

(71) Applicant: DATOMETRY, INC., San Francisco, CA (US)

(72) Inventors: Florian Michael Waas, San Francisco, CA (US); Mohamed Soliman, Foster City, CA (US); Zhongxian Gu, Sunnyvale, CA (US); Lyublena Rosenova Antova, Sunnyvale, CA (US); Tuan Anh Cao, San Francisco, CA (US); Entong Shen, Foster City, CA (US); Michael Alexander Duller, San Francisco, CA (US); John Eshleman, Mountain View, CA (US)

(73) Assignee: DATOMETRY, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,321

(22) Filed: Jun. 26, 2018

(65) Prior Publication Data

US 2018/0329916 A1 Nov. 15, 2018

Related U.S. Application Data

(63) Continuation of application No. 15/150,389, filed on May 9, 2016, now Pat. No. 10,255,336.

(60) Provisional application No. 62/158,484, filed on May 7, 2015.

(51) Int. Cl.
*G06F 16/25* (2019.01)
*H04L 29/06* (2006.01)

(52) U.S. Cl.
CPC .......... *G06F 16/252* (2019.01); *H04L 63/08* (2013.01)

(58) Field of Classification Search
CPC .............................. G06F 16/252; H04L 63/08
See application file for complete search history.

(56) References Cited

U.S. PATENT DOCUMENTS

| | | | |
|---|---|---|---|
| 5,970,490 A | 10/1999 | Morgenstern | |
| 6,704,747 B1 | 3/2004 | Fong | |
| 6,889,227 B1 * | 5/2005 | Hamilton | G06F 16/252 |
| 7,359,916 B2 * | 4/2008 | Werner | G06F 16/252 |

(Continued)

OTHER PUBLICATIONS

Antova, Lyublena, et al., "Datometry Hyper-Q: Bridging the Gap Between Real-Time and Historical Analytics," SIGMOD'16, Jun. 2016, 12 pages, San Francisco, CA, USA.

(Continued)

*Primary Examiner* — Matthew Smithers
(74) *Attorney, Agent, or Firm* — Adeli LLP

(57) ABSTRACT

A method for providing interoperability between a plurality of database management system. The method comprises a server communicably connected to a plugin-application; receiving, from the source application, a connection request; intercepting communications issued by the source application to a source database management system; and responsive to said intercepted communications, impersonating the source database management system as a target database management system.

18 Claims, 8 Drawing Sheets

(56) References Cited

U.S. PATENT DOCUMENTS

| | | | |
|---|---|---|---|
| 7,693,913 B2* | 4/2010 | Goto | G06F 9/541 |
| | | | 707/792 |
| 7,885,968 B1 | 2/2011 | Hamamatsu et al. | |
| 8,429,601 B2 | 4/2013 | Andersen | |
| 8,447,774 B1 | 5/2013 | Robie et al. | |
| 8,631,034 B1 | 1/2014 | Peloski | |
| 8,793,797 B2 | 7/2014 | Meenakshisundaram | |
| 8,943,181 B2 | 1/2015 | Kasten et al. | |
| 10,255,336 B2 | 4/2019 | Waas et al. | |
| 10,261,956 B2 | 4/2019 | Jugel et al. | |
| 2001/0034733 A1 | 10/2001 | Prompt et al. | |
| 2002/0133504 A1 | 9/2002 | Vlahos et al. | |
| 2002/0161907 A1 | 10/2002 | Moon | |
| 2005/0080914 A1 | 4/2005 | Lemer et al. | |
| 2006/0242297 A1 | 10/2006 | Aronoff et al. | |
| 2007/0136311 A1 | 6/2007 | Kasten et al. | |
| 2009/0024622 A1 | 1/2009 | Chokodrov et al. | |
| 2009/0132503 A1* | 5/2009 | Sun | G06F 16/2452 |
| 2009/0319498 A1* | 12/2009 | Zabokritski | G06F 16/2452 |
| 2010/0169377 A1 | 7/2010 | Galeazzi et al. | |
| 2011/0010379 A1* | 1/2011 | Gilderman | G06F 16/252 |
| | | | 707/759 |
| 2011/0154461 A1 | 6/2011 | Anderson et al. | |
| 2011/0276623 A1 | 11/2011 | Girbal | |
| 2012/0036146 A1 | 2/2012 | Annapragada | |
| 2012/0158650 A1 | 6/2012 | Andre et al. | |
| 2013/0163737 A1 | 6/2013 | Dement et al. | |
| 2013/0262425 A1* | 10/2013 | Shamlin | G06F 16/256 |
| | | | 707/703 |
| 2013/0311729 A1 | 11/2013 | Navarro et al. | |
| 2013/0325927 A1 | 12/2013 | Corbett et al. | |
| 2014/0325096 A1 | 10/2014 | Jung et al. | |
| 2015/0095381 A1 | 4/2015 | Chen et al. | |
| 2015/0172206 A1 | 6/2015 | Anderson et al. | |
| 2015/0269223 A1 | 9/2015 | Miranker et al. | |
| 2015/0339361 A1 | 11/2015 | Kumar et al. | |
| 2016/0292164 A1* | 10/2016 | Kedia | G06F 16/21 |
| 2016/0328442 A1 | 11/2016 | Waas et al. | |
| 2017/0063936 A1 | 3/2017 | Waas et al. | |
| 2017/0116260 A1 | 4/2017 | Chattopadhyay | |
| 2017/0177650 A1* | 6/2017 | Devine | G06F 16/2455 |
| 2018/0173775 A1 | 6/2018 | Li et al. | |
| 2019/0303379 A1 | 10/2019 | Waas et al. | |

OTHER PUBLICATIONS

Antova, Lyublena, et al., "An Integrated Architecture for Real-Time and Historical Analytics in Financial Services," Month Unknown 2015, 8 pages, San Francisco, CA, USA.

Author Unknown, "46.2. Message Flow," PostgreSQL 9.2.24 Documentation, Chapter 46: Frontend/Backend Protocol, Nov. 9, 2017, 8 pages, The PostgreSQL Global Development Group, retrieved from https://www.postgresql.org/docs/9.2/static/protocol-flow.html.

Author Unknown, "46.5. Message Formats," PostgreSQL 9.2.24 Documentation, Chapter 46: Frontend/Backend Protocol, Nov. 9, 2017, 8 pages, The PostgreSQL Global Development Group, retrieved from https://www.postgresql.org/docs/9.2/static/protocol-message-formats.html.

Author Unknown, "Greenplum Database: Critical Mass Innovation," Architecture White Paper, Aug. 2010, 17 pages, EMC Corporation, San Matteo, CA, USA.

Author Unknown, "Informatica Data Services," Data Sheet, Month Unknown, 2015, 4 pages, Informatica LLC, Redwood City, CA, USA.

Author Unknown, "Informatica PowerCenter Data Virtualization Edition," Data Sheet, Month Unknown, 2013, 8 pages, Informatica LLC, Redwood City, CA, USA.

Author Unknown, "Introduction to InfoSphere Federation Server," IBM InfoSphere Foundation Tools IBM InfoSphere Information Server, Version 8.7.0, Oct. 1, 2011, 4 pages, IBM.

Author Unknown, "MemSQL Overview," White Paper, Aug. 2018, 4 pages, MemSQL Inc.

Author Unknown, "Microsoft Analytics Platform System," Jan. 2016, 2 pages, Microsoft Corporation.

Author Unknown, "Reference/ipcprotocol," Feb. 13, 2017, 8 pages, retrieved from http://code.kx.com/wiki/Reference/ipcprotocol.

Author Unknown, "Teradata Vantage," Data Sheet, Month Unknown, 2018, 3 pages, Teradata Corporation, San Diego, CA, USA.

Author Unknown, "The 21st Century Time-series Database," White Paper, Jul. 2016, 10 pages, Kx Systems, Inc.

Author Unknown, "The Denodo Platform 7.0," White Paper, Month Unknown, 2018, 44 pages, Denodo Technologies.

Bear, Chuck, et al., "The Vertica Database: SQL RDBMS for Managing Big Data," MBDS'12, Sep. 21, 2012, 2 pages, ACM, San Jose, CA, USA.

Chang, Lei, et al., "HAWQ: A Massively Parallel Processing SQL Engine in Hadoop," SIGMOD'14, Jun. 22-27, 2014, 12 pages, ACM, Snowbird, Utah, USA.

Garland, Simon, "Big Data Analytics: Tackling the Historical Data Challenge," Wired Magazine, Month Unknown 2014, 3 pages.

Gog, Ionel, et al. "Musketeer: all for one, one for all in data processing systems," EuroSys'15, Apr. 21-24, 2015, 16 pages, ACM, Bordeaux, France.

Gorman, Ciarán, "Columnar Database and Query Optimization," Technical Whitepaper, Mar. 2013, 26 pages, kx.

Gupta, Anurag, et al., "Amazon Redshift and the Case for Simpler Data Warehouses," SIGMOD'15, May 31, 2015-Jun. 4, 2015, 7 pages, ACM, Melbourne, Victoria, Australia.

Hanna, James, "Multi-Partitioned kdb+ Databases: An Equity Options Case Study," Technical Whitepaper, Oct. 2012, 13 pages, kx.

Heimbigner, Dennis, et al., "A Federated Architecture for Information Management," ACM Transactions on Information Systems (TOIS), Jul. 1985, vol. 3, Issue 3, 26 pages, New York, NY, USA.

Pullokkaran, Laljo John, "Analysis of Data Virtualization & Enterprise Data Standardization in Business Intelligence," Working Paper CISL# Oct. 2013, May 20, 2013, 60 pages, Massachusetts Institute of Technology, Cambridge, Massachusetts, USA.

Schlamb, Kelly, "dashDB: Self-service data warehousing in the cloud at any scale," DB2 Tech Talk, Jun. 25, 2015, 55 pages, IBM Corporation.

Soliman, Mohamed A., et al., "Orca: A Modular Query Optimizer Architecture for Big Data," SIGMOD'14, Jun. 22-27, 2014, 12 pages, ACM, Snowbird, Utah, USA.

Whitney, Arthur, et al., "Lots o' Ticks: real-time high performance time series queries on billions of trades and votes," ACM SIGMOD 2001, May 21-24, 2001, 1 page, ACM, Santa Barbara, California, USA.

Aleyasen, A., et al., "High-Throughput Adaptive Data Virtualization via Context-Aware Query Routing," 2018 IEEE International Conference on Big Data, Dec. 2018, 10 pages.

Antova, Lyublena, et al., "Rapid Adoption of Cloud Data Warehouse Technology Using Datometry Hyper-Q," Month Unknown, 2017, 12 pages, Datometry, Inc.

Author Unknown, "Replatforming Custom Business Intelligence," Technical White Paper, Month Unknown, 2017, 6 pages, Datometry, retrieved from https://bit.ly/2KIForR.

Author Unknown, "Teradata Data Warehouse—End of Useful Life," Month Unknown, 2017, 6 pages, Datometry, retrieved from https://datometry.com/resources/case-studies/replafform-teradata-end-of-useful-life-replatforming-to-cloud/.

Non-Published commonly Owned U.S. Appl. No. 16/378,556, filed Apr. 8, 2019, 69 pages, Datometry, Inc.

Flories et al , "SeDIM :A Middleware Framework for Interoperable service Discovery in heterogeneous Networks", Feb. 2011, ACM Transaction on Autonomoue and Adaptive Systems, vol. 6, No. 1, Article 6, pp. 1-8 (Year.2011).

Wang et al, "Anomaly detection in the case of Message oriented Middleware", Dec. 2008, ACM, pp. 40-42. (Year.2008).

Author Unknown, "AWS Database Migration Service," Month Unknown, 2017, 8 pages, Amazon Web Services, Inc., retrieved from https://aws.amazon.com/dms/.

Author Unknown, "DBBest Technologies," Month Unknown, 2017, 3 pages, DB Best Technologies, LLC, retrieved from https://www.dbbest.com/.

(56) References Cited

OTHER PUBLICATIONS

Author Unknown, "Ispirer," Month Unknown, 2017, 5 pages, Ispirer Systems, LLC, retrieved from https://www.ispirer.com/.

Author Unknown, "Linked Servers (Database Engine)," Oct. 14, 2019, 5 pages, Microsoft, retrieved from https://docs.microsoft.com/en-us/sql/relational-databases/linked-servers/linked-servers-database-engine?view=sql-server-ver15.

Heimbigner, Dennis, et al., "A Federated Architecture for Information Management," ACM Transactions on Office Information Systems, Jul. 1985, 26 pages, vol. 3, No. 3, ACM.

Hwang, San-Yih, "The MYRIAD Federated Database Prototype," SIGMOD '94 Proceedings of the 1994 ACM SIGMOD International Conference on Management of Data, May 24-27, 1994, 1 page, ACM, New York, New York, USA.

Kache, Holger, et al., "POP/FED: Progressive Query Optimization for Federated Queries in DB2," VLDB '06, Sep. 12-15, 2006, 4 pages, ACM, Seoul, Korea.

Simitsis, Alkis, et al., "Optimizing Analytic Data Flows for Multiple Execution Engines," SIGMOD '12, May 20-24, 2012, 12 pages, ACM, Scottsdale, Arizona, USA.

* cited by examiner

FIG. 7

METHOD AND SYSTEM FOR TRANSPARENT INTEROPERABILITY BETWEEN APPLICATIONS AND DATA MANAGEMENT SYSTEMS

This application claims the benefit of priority to U.S. patent application Ser. No. 15/150,389 filed on May 9, 2016, now issued as U.S. Pat. No. 10,255,336, and entitled "METHOD AND SYSTEM FOR TRANSPARENT INTEROPERABILITY BETWEEN APPLICATIONS AND DATA MANAGEMENT SYSTEMS", which is incorporated herein by reference. U.S. patent application Ser. No. 15/150,389 claims benefit of U.S. Provisional patent application 62/158,484, filed May 7, 2015.

FIELD

Embodiments of the present invention relate to database systems.

BACKGROUND

Generally, a database application is written and configured to execute against a specific database management system. However, there are many cases where it is desirable to have the database application execute against another database management system. In such cases, there is not interoperability between the different database management systems from the point of view of the database application.

SUMMARY

Generally, a database application is written and configured to execute against a specific database management system. However, there are many cases where it is desirable to have the database application execute against another database management system. In such cases, there is not interoperability between the different database management systems from the point of view of the database application.

Advantageously, the adaptive data virtualization platform enables de-coupling of applications from underlying database systems said applications are designed to work with in a way that is completely transparent and non-intrusive.

The adaptive data virtualization platform enables an application written for one specific database to run on a wide variety of alter-native database systems—fully transparently and without requiring changes to the application. Beneficially, this effectively liberates enterprises from vendor lock-in, and provides businesses with greater flexibility to adopt database technology and modernize their data infrastructure.

Other aspects of the invention will be apparent from the detailed description below.

BRIEF DESCRIPTION OF THE DRAWINGS

FIG. 7 shows the raw byte representation of a tabular result set, with two columns c1 and c2 and two rows {(1, 1), (2, 2)}, using both QIPC and PG v3 protocols.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention disclose techniques and systems to allow a target database system to impersonate a source database management system (DBMS) so that, advantageously, a source application written and configured to execute against the source DBMS can execute against the target database management system (DBMS) in a seamless or transparent manner without any changes to the source application.

Figure 1:
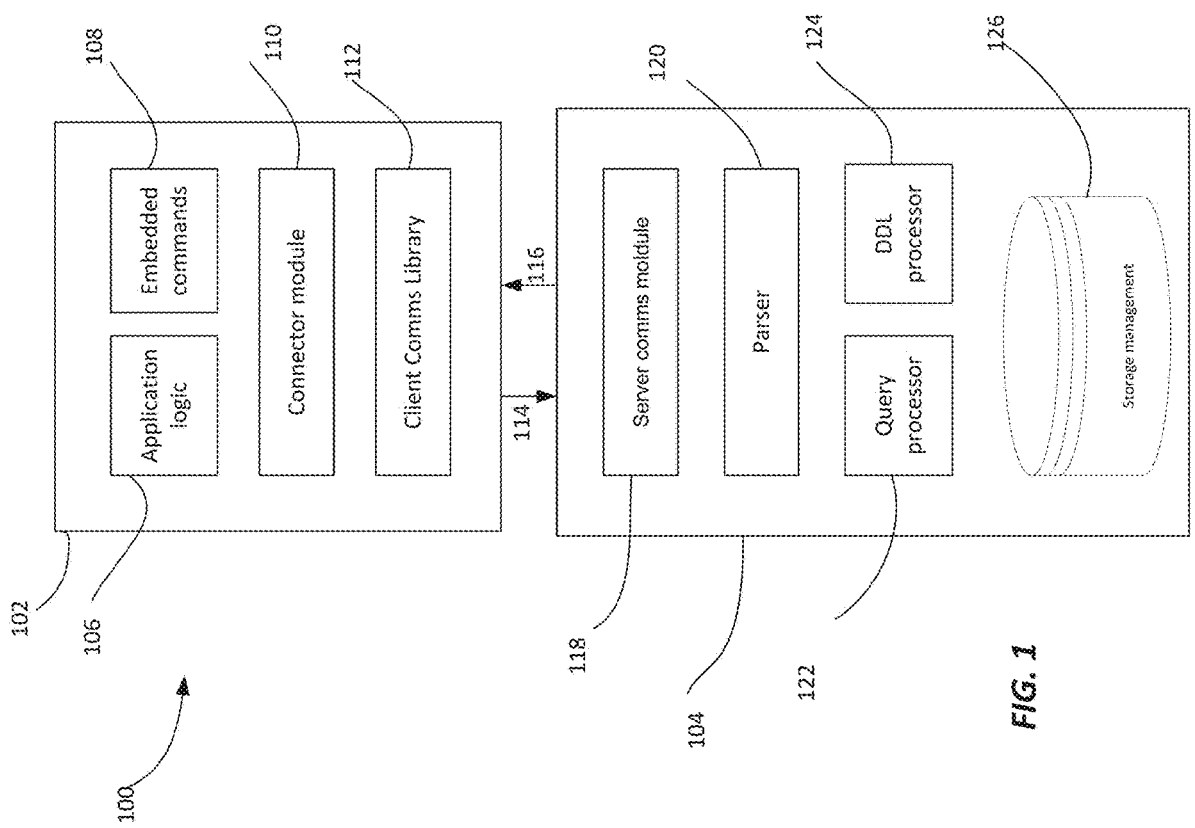
FIG. 1 schematically illustrates a typical deployment scenario for a database application.

FIG. 1 schematically illustrates a typical deployment scenario 100 comprising a source application 102 coupled with a DBMS 104. As will be seen, the source application 102 comprises application logic 106 formulated in some programming language that encodes proprietary functionality provided by the source application 102. To access data stored in the DBMS 104, the source application 102 comprises embedded database commands 108. These database commands 108 may include queries or language to define or manipulate data in the DBMS 104 based on a database-specific protocol or document definition language (DDL). These commands may be submitted to DBMS 104 via generic application program interface (API) calls provided by a connector module 110. For example, the connector module may comprise OBDC or JDBC libraries. The APIs translate the calls into native database communication primitives using a database-specific client native communication library 112. The connector library 112 may be designated by static configuration of the application 102. APIs and client-side communication libraries are typically provided by a database vendor, or third-party vendors.

The native communication library 112 manages a network connection 114 to the system 104 using a database proprietary network protocol. The DBMS 104 communicates with source application 102 via a server-side protocol communications module 118 and decodes incoming packets and their payload using a parser 120. Using a query processor 122 and a DDL processor 124, the DBMS 104 executes client commands over data stored and managed by a storage management system 126. Depending on the nature of the database commands or queries, the DBMS 104 returns messages 116 to the source application 102 based on the database-specific protocol.

In order for the source application 102 to be deployed with a different type of database, say a target DBMS, two kinds of major modifications are required. Firstly, the embedded commands, which are highly database-specific, need to be reformulated in the language of target DBMS; and secondly, the source application 102 needs to be reconfigured to use connector APIs and in a defined condition in every associated with the target DBMS.

Figure 2:
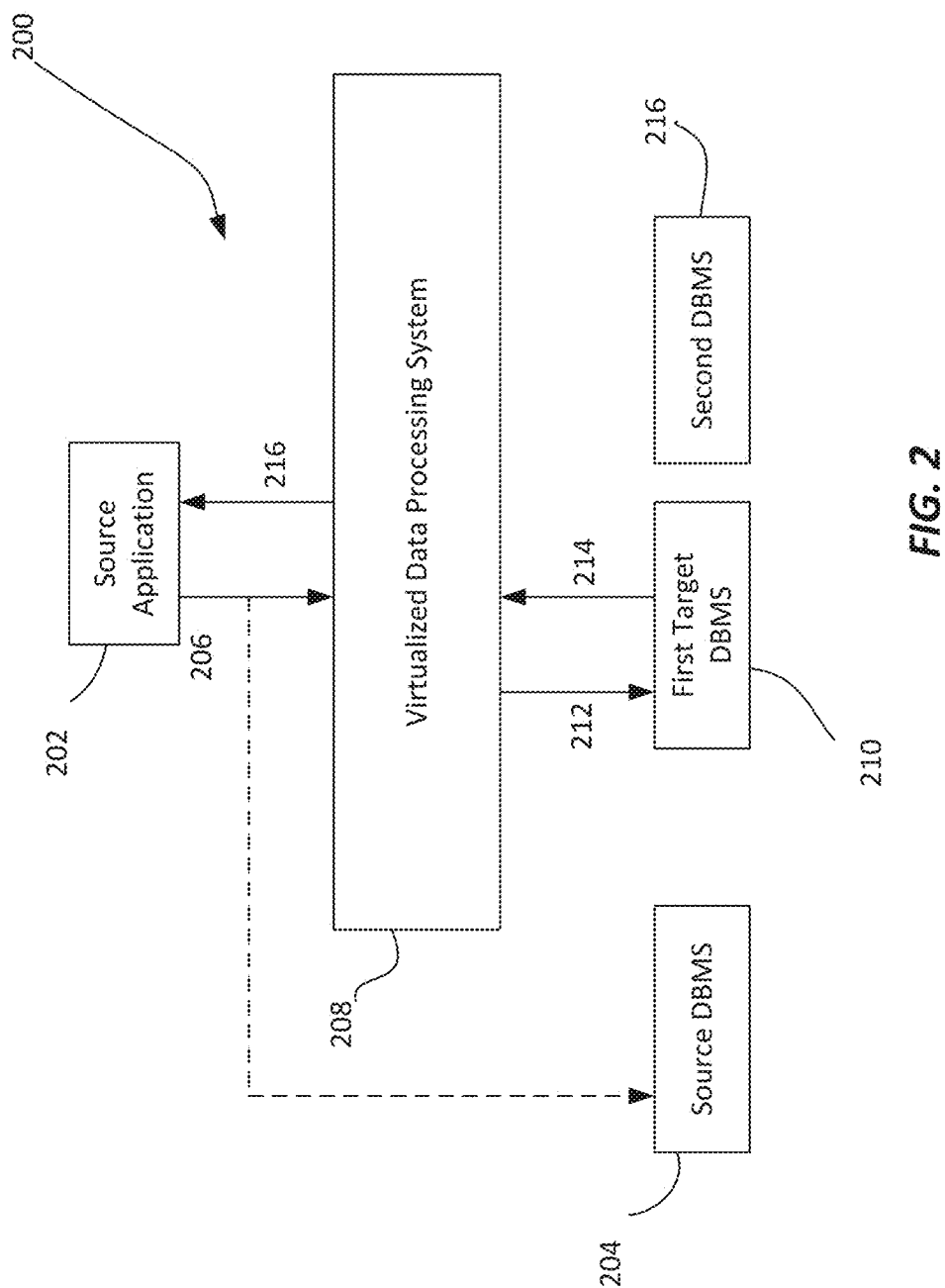
FIG. 2 shows a deployment scenario for such a virtualized data processing system, in accordance with one embodiment.

In accordance with one embodiment of the invention, a system to facilitate impersonation of a source database management system may be realized as a virtualized data processing system. FIG. 2 shows a deployment scenario 200 for such a virtualized data processing system, in accordance with one embodiment. Referring to FIG. 2, it will be seen that the deployment scenario 200 includes a source application 202 configured to issue communications to a source DBMS 204. For example, one such communication may include a query 206 was written for a particular query language supported by the source DBMS 204. To provide a "real world" example, the query 206 may be formulated in accordance with the query language Q and the source DBMS may support a time series database such as kdb+.

Ordinarily, the query 206 is encoded based on a wire protocol and transmitted directly to the source DBMS 204, as indicated by the dotted line in the FIG. 2. However, in accordance with the techniques disclosure, the query 206 is intercepted by a virtualized data processing system 208 which is disposed between the source application turned into and a first target DBMS 210. As will be explained in greater detail below, the virtualized data processing system 208 is adapted to impersonate the source DBMS 204. For example, in one embodiment the system 208 may transform the communication or query issued by the source application 202 is transformed into an equivalent form which is then issued to the first target DBMS 210. The arrow 212 indicates the transformed query being sent to the DBMS 210, whereas the arrow 214 indicates a response to the transformed query being sent to the system 208. The system 208 then performs a reverse operation to transform said response into a reply message 216 that can be understood by the source application 202.

It is to be understood that the virtualized data processing system 208 may be used to impersonate any source DBMS 204. Moreover, in addition to virtualizing the data of the source DBMS 204 so that it may be impersonated by the first target DBMS 210, the system 208 may also use other databases to impersonate the source DBMS 204. Thus for example, the source DBMS 204 may be impersonated by a second DBMS 216, by the virtualized data processing system 208, in accordance with the techniques disclosed herein.

Without a loss of generality, and merely to illustrate the techniques of the present invention in greater detail, for the remainder of this description, an exemplary form of the virtualized data processing system 208 referred to herein as the "Hyper Q" platform will be described.

The rationale for the Hyper Q platform comes from Wall Street. Wall Street's trading engines are complex database applications written for time series databases like kdb+ that uses the query language Q to perform real-time analysis. Extending the models to include other data sources, e.g., historic data, is critical for back testing and compliance. However, Q applications cannot run directly on SQL databases. Therefore, financial institutions face the dilemma of either maintaining two separate application stacks, one written in Q and the other in SQL, which means increased cost and increased risk, or migrating all Q applications to SQL, which results in losing the inherent competitive advantage on Q real-time processing. Neither solution is desirable as both alternatives are costly, disruptive, and suboptimal. The Hyper-Q platform, as a data virtualization platform overcomes the chasm. The Hyper-Q platform enables Q applications to run natively on PostgreSQL-compatible databases by translating queries and results "on the fly" or in real-time, as will be described.

Before describing the Hyper Q platform, a high-level overview of the kdb+ database is provided below primarily to highlight the challenges involved in translating queries written in the query language Q into a relational language, such as SQL.

kdb+ is a columnar database specifically designed for real-time analytics. Its premier application area is in-memory query processing although it can operate over on-disk data. Kdb+ lacks many of the features found in classical relational database systems such as ACID transactions. Like other special purpose database systems, kdb+ accomplishes isolation through serialization, i.e., the main server loop executes a single request at a time. Concurrent requests are queued to be executed serially. Atomicity, consistency and durability are the application's responsibility, if desired. For historical reasons, kdb+ had no need for access control or sophisticated security mechanisms. Similarly, kdb+ does not provide built in support for data replication. Disaster recovery or high-availability are accomplished through external tooling. kdb+ is queried using Q, a highly domain-specific query language. Q is distinguished by its terse syntax. It is rich in idioms that are specifically tailored to the financial analytics use case. The highly compressed syntax is often lauded for eliminating room for error: a single line of Q may correspond to an entire page of SQL, the correctness of which is usually much harder to ascertain. Q pre-dates most of the OLAP extensions found in recent SQL standard which initially gave it a unique competitive advantage over relational database languages. More recently, the SQL standard has caught up and provides sufficient language constructs to implement equivalent functionality.

Unlike relational databases, Q is not based on a tabular calculus. Rather, Q is a list processing language that supports, besides scalar data types, several compound types such as dictionaries or tables, which are made up of lists. Lists are, by definition, ordered, which in turn greatly facilitates time series analysis in Q.

As a recent addition to the language, Q features several SQL-like constructs even though their semantics often diverge from relational dialects in surprising ways. For example, UPDATE operation in Q simply replaces columns in the query output instead of changing any persisted state.

To illustrate the expressiveness of Q consider the following example:

Example 1

A standard point-in-time query to get the prevailing quote as of each trade:

```
aj[` Symbol`Time;
select Price from trades
where Date=SOMEDATE, Symbol in SYMLIST;
select Symbol, Time, Bid, Ask from quotes
where Date=SOMEDATE]
```

This query is one of the most commonly used queries by financial market analysts. It can be used to measure the difference between the price at the time users decide to buy and the price paid at actual execution, i.e. the fill message reported by the broker. The as-of-join (aj) is a unique built-in function in Q which natively supports time-series queries. In this query, Symbol and Time are the columns to join on, and trades is a reference table and quotes is a table to be looked up.

The performance of this query largely depends on the size of the quotes table. If the data is small enough so that the underlying database has one partition per date, this as-of-join achieves very good performance. Instead of reading the entire Symbol, Time, Bid, and Ask columns into memory to perform the lookup, it can search through the memory map of the quotes table. However, if the quotes table is large, and there are multiple partitions per date, all partitions need to be read into memory to perform the lookup since rows with the same symbol could occur in multiple partitions. To work around this, Q programmers often need to manually rewrite the above query to do as-of-join on each partition and then aggregate the result from each partition. The rewrite is very complex and requires deep knowledge of the structure of the underlying database.

kdb+ does not have a query optimizer. A query is executed in reverse order of its components. Q programmers have to determine join orders explicitly in their queries and have to be aware of how individual operations such as a lookup-join are executed. Mistakes in crafting the query may have severe consequence for the performance of a query or even crash the server process due to out-of-memory conditions.

In many ways, performance is achieved by exposing to users how data is actually stored so that users can take advantages of this while constructing queries. For example, Q allows marking a list as having all occurrences of a value occurring in a sequential block. This allows the creation of a lookup table from each distinct value to its first occurrence, then all occurrences of that value can be found in one sequential read. As a consequence, Q programmers often need to understand how underlying data is structured in order to write optimal queries.

Due to considerable differences in query language and data model, building a virtualized system that allows a Q application to run on top of a SQL database involves multiple challenges including the following:

(a) Q applications communicate with kdb+ using a specific wire protocol which is usually very different from the wire protocol of the underlying SQL database.

(b) While SQL databases typically implement protocols that stream individual rows, Q uses an object-based protocol that communicates a query results as a single message. In order to run Q applications seamlessly on an SQL database, packets in Q wire format need to converted to the underlying database wire format and vice versa. This conversion includes the transformation of data types and values as well as the pivoting of database rows into the object-based format that is to be presented to the application.

(c) While SQL is based on set/bag semantics, in which order of rows in a table is not defined, Q is based on ordered-list semantics, in which ordering is the first class citizen for all complex data structures, such as tables and dictionaries. In particular, each Q table has an implicit order column. Providing implicit ordering using SQL requires database schema changes and imposes challenges on query generation.

(d) Q is column-oriented, i.e., it stores tables as columns and can apply operations to entire column. In contrast to Q, SQL is not column-oriented. Even in columnar SQL databases, the support is mainly implemented in the underlying storage and execution engines. Therefore, query constructs that express column-wise operations cannot be easily specified in SQL.

(e) Q uses a two-valued logic in contrast to SQL's three-valued logic. Operations on null values have very different semantics in Q and in SQL. For example, two nulls compare as equal in Q, while the result is undefined/unknown in SQL Imposing these semantics on SQL queries requires careful composition of query constructs to maintain correctness of the results.

(f) Unlike SQL which is statically typed, Q is dynamically typed where the type of a variable is determined by its value. Consider an expression x+y, if x and y are not statically defined then their types are determined by the values assigned to them at runtime. In particular, if x and y are assigned scalar values then x and y have scalar type; if x and y are assigned as lists then x and y have list type. Translating a dynamic-typed language to a static-typed language requires significant amount of runtime support. If not done efficiently, type inference may add a considerable overhead to the query latency.

(g) Q expressions are evaluated strictly right-to-left with no operator precedence, reflecting the implementation of the underlying execution engine. This is considerably different from expression evaluation using SQ.

Q programmers are often unwilling to switch to SQL and its verboseness. A single line of Q code may be semantically equivalent to a large snippet of SQL. It can be challenging to reason about the correctness of such transformation by eyeballing. Manual migration of complex applications quickly becomes infeasible. Additional challenges arise from operational aspects such as using advanced authentication mechanisms (e.g., Kerberos).

The Hyper Q Platform

The Hyper-Q platform bridges the gap between real time and historical data analytics by virtualizing the data processing layer. Using the Hyper-Q platform, applications and workloads written in the Q language can run unchanged while using a PostgreSQL (PG) compatible database for running data analytics.

Q to SQL translation is only one of the problems that need to be addressed to enable such communication. Other problems include (i) network communication, where queries and results need to be parsed, transformed and packaged according to the wire protocols of the two end systems, and (ii) state management, where a variable may be defined and reused across multiple queries.

Figure 3:
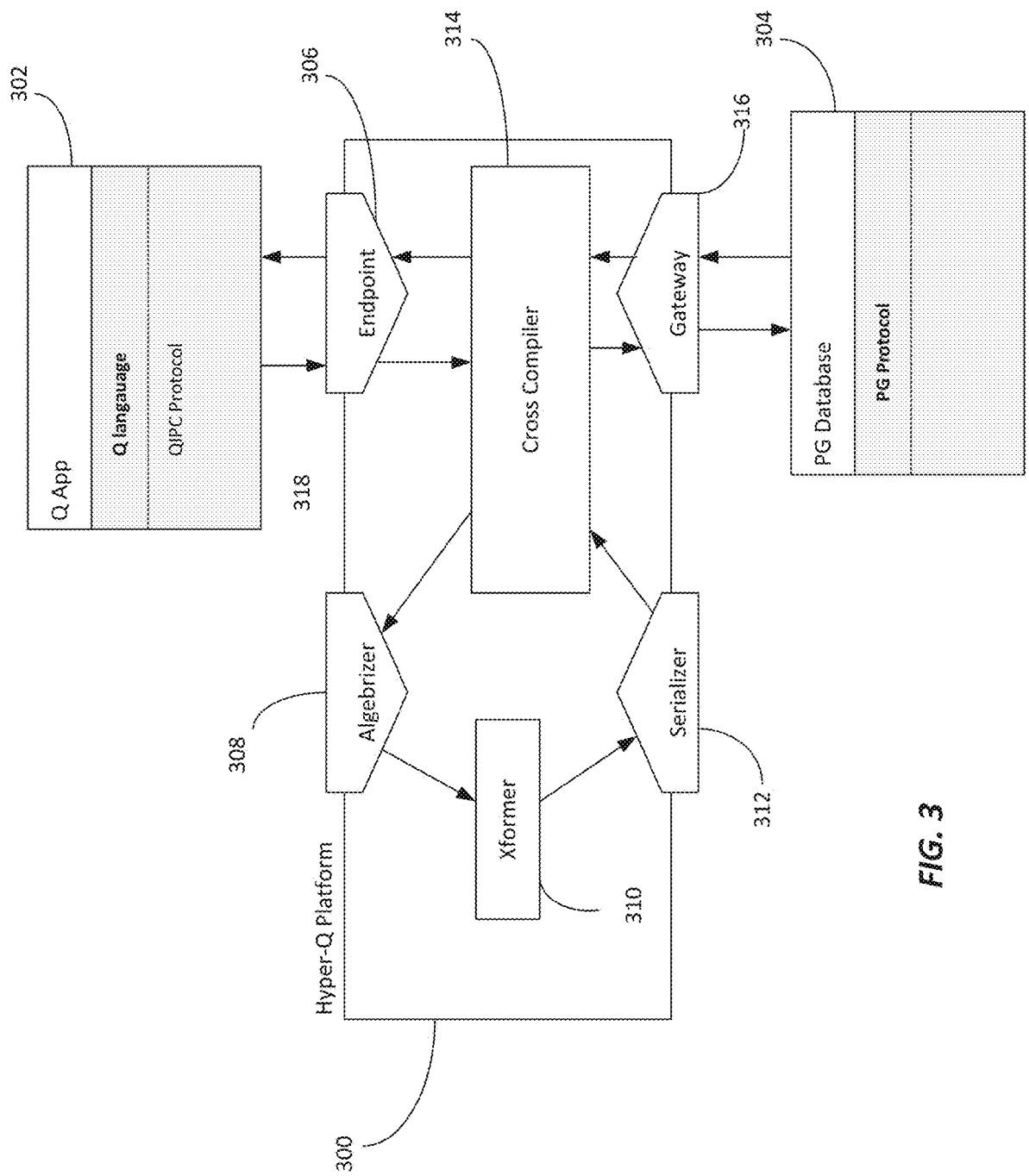
FIG. 3 shows a high-level architectural diagram of the Hyper-Q platform, in accordance with one embodiment.

FIG. 3 shows a high-level architectural diagram of the Hyper-Q platform 300, in accordance with one embodiment. The platform is configured to facilitate communications between a Q application 302 and a PG database 304. Components of the platform 300 include an endpoint module 306, an algebrizer module 308, a transformer (Xformer) module 310, a serializer module 312, a cross-compiler module 314, and a gateway module 316. The operation performed by of each of these component will be apparent to one of ordinary skill in the art from the description below.

Query Life Cycle.

A connection request is sent from the Q application 302 to the Hyper-Q platform 300. The connection request is encoded according to the Q-Inter Process Communication (QIPC) wire protocol. In one embodiment, the connection request is first authenticated by the Hyper-Q platform 300, as will be described in greater detail below.

Once authenticated, the Q application 302 uses the Hyper-Q platform 300 connection to send Q query messages to the Hyper-Q platform 300. One such message is indicated by reference numeral 318 for discussion purposes. The algebrizer module 308 parses the incoming Q query 318 and transforms it into an extensible relational algebra expression, as will be described later. The Xformer module 310 then modifies the algebraic expression by applying a series of transformations to guarantee correct query semantics and optimize query performance. The end algebraic expression is then translated into one or more SQL query messages encoded using the PG v3 wire protocol. The SQL queries are sent to PG database for processing. Query results are translated back into the QIPC data format before getting sent to the Q application 302. These operations are managed by the Cross Compiler (XC) module 314. In one embodiment, system-specific plugins are used for handling network communication, parsing messages exchanged between the Q application and the database, as well as generating query messages.

The Hyper-Q platform 300 may be configured to virtualize access to different databases by adopting a plugin-based architecture with version-aware system components. For example, the algebrizer module 308 may trigger parsing rules based on the type and version of the database system that the source client application is designed to work with. Similarly, the Xformer module 310 may trigger transformations based on the type and version of the backend or target database system. This flexibility allows the Hyper-Q platform 300 to support Q applications that were designed to run on top of specific versions of the kdb+ system, as well as PG-based database systems that have deviated in functionality or semantics from the core PG database. Non-PG database systems may be supported by adding a plugin to the platform 300 that enables query and result transformation as well as network protocol support for the desired database system. Components of the Hyper-Q platform 300 that enable Q clients to work with PG-compatible databases in accordance with one embodiment will now be described.

Network Communication kdb+ uses TCP/IP for inter-process communication. The QIPC wire protocol describes message format, process handshake, and data compression. Messages can be of different types including connection open/close and synchronous/asynchronous calls. PG uses its own message-based protocol for communication between applications and servers. The PG wire protocol is supported over TCP/IP as well as Unix domain sockets. The QIPC and PG wire protocols are widely different in terms of message format and process handshakes. The network packets transmitted from Q applications cannot be directly parsed by PG servers. To enable such communication, the Hyper-Q platform 300 may be configured to act as a bridge between the two protocols. The Hyper-Q platform 300 takes over a kdb+ server by listening to incoming messages on the port used by the original kdb+ server. Q applications run unchanged while, under the hood, their network packets are routed to the Hyper-Q platform 300 instead of kdb+.

An incoming message to the Hyper-Q platform 300 may include a Q query. The endpoint module 306 is a kdb+-specific plugin configured for handling the communication between Q application 302 and the Hyper-Q platform 300. The endpoint module 306 parses the incoming message, extracts the query text and passes it to the algebrizer module 308 for subsequent processing, as will be explained later.

The Hyper-Q platform 300 transforms incoming Q queries into semantically equivalent SQL queries, compatible with the backend PG database. The gateway module 316 is a PG-specific plugin configured for handling the communication between the Hyper-Q platform 300 and PG database. The gateway module 316 packs a SQL query into a PG formatted message and transmits it to PG database for processing. After query execution is done, the query results are transmitted back from PG server to the Hyper-Q platform 300. The Hyper-Q platform 300 extracts the row sets from result messages and packs them into messages with the same format that a Q application expects (i.e., using the QIPC protocol). The formatted messages are sent to the endpoint module 306, which in turn forwards the results back to the Q application 302.

Some of the previous operations could be performed using a database driver (e.g., ODBC/JDBC driver). However, integrating a third party driver in the data pipeline adds further complexity and comes with performance overhead. Processing network traffic natively is key for high throughput in the Hyper-Q platform 300.

Algebrizer Module 308

The algebrizer module 308 translates a Q query into an eXTended Relational Algebra (XTRA) expression. XTRA is the internal query representation in the Hyper-Q platform 300. It uses a general and extensible algebra to capture the semantics of query constructs, and make the generation of SQL queries a systematic and principled operation. The algebrizer module 308 may be configured to operate in two steps. In the first step, the Q query text is parsed into a Q abstract syntax tree AST. In the second step, the AST is bound to an XTRA tree by resolving all variable references through metadata lookup and translating Q operators to semantically equivalent XTRA tree nodes. To understand the parsing and the binding steps, consider the following example:

Example 2

Consider the following Q query, which computes the so called as-of-join (aj) of two tables trades and quotes. For each record in trades, aj returns a matching value of the Symbol column in quotes. A match occurs based on an implicit range condition on the Time column. If no match is found, a null value is returned.

aj['Symbol' Time; trades; quotes]

Figure 4:
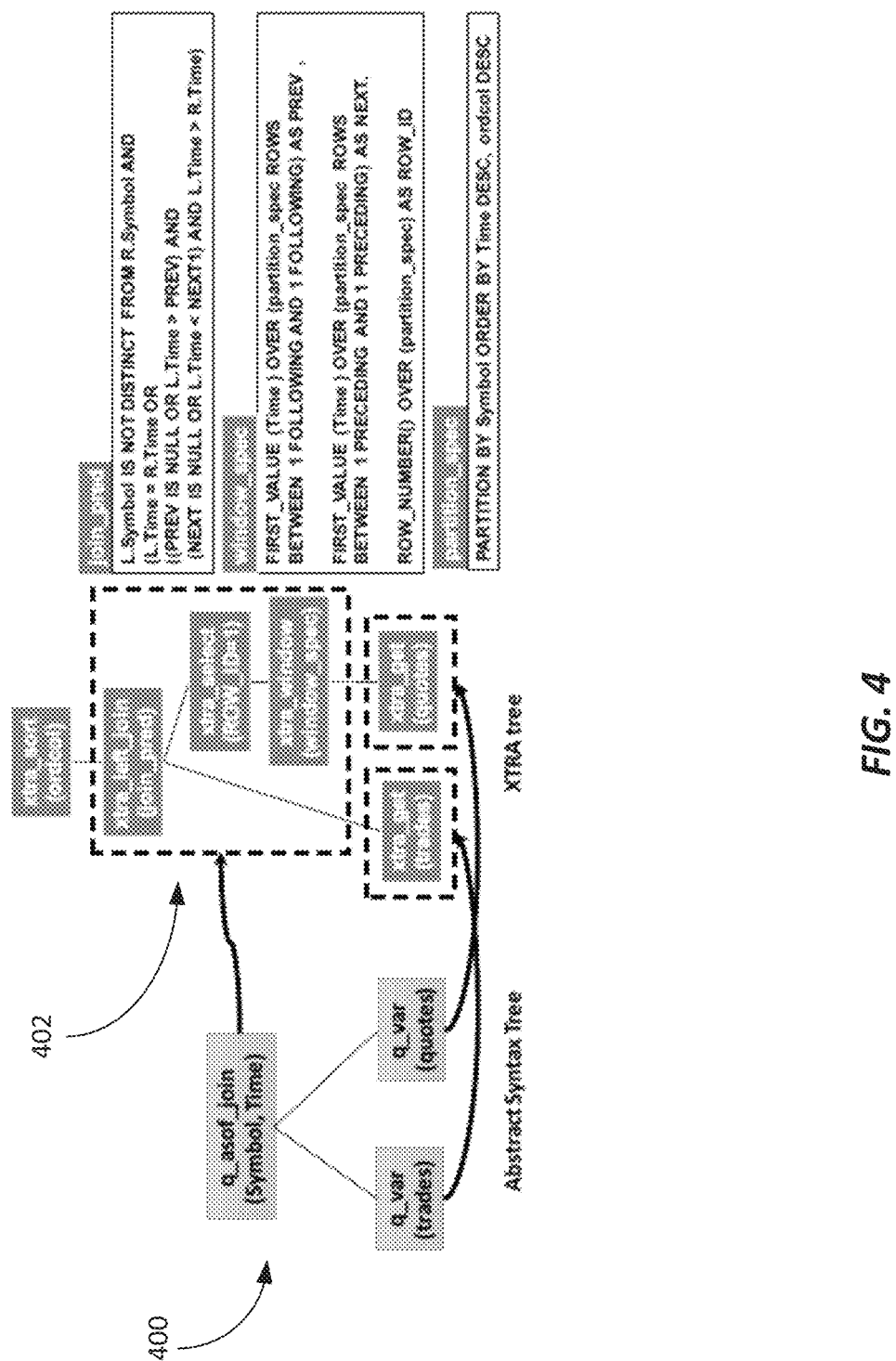
FIG. 4 shows a tree structure for representing a query in intermediate form, in accordance with one embodiment of the invention.

The algebrization result of Example 2 is shown in FIG. 4. Below are the details of how algebrization is done, in accordance with one embodiment.

Parsing

A parser (which is not shown, but may be a component of the alegbrizer 308) converts Q query text to an AST. In contrast to traditional relational query languages like SQL, the data model of Q allows for stand-alone table, scalar, list, or dictionary queries to be expressed in the query language. Variables are dynamically typed based on the values they are bound to. Moreover, the query syntax does not restrict the type of the result. To illustrate, consider the following Q language examples:

| | |
|---|---|
| x: | 1 |
| x: | 1 2 3 |
| x: | select from trades |

The first statement assigns a scalar value 1 to variable x. The second statement redefines x to be a list, while the third statement redefines x again to be a table expression. The type of x depends on the value it is bound to. Global variables are stored in kdb+ server's memory, and they can be redefined and used from different Q query clients. The Q query x+y could be interpreted as arithmetic addition of two scalars or a pairwise addition of list elements. It could also raise an error if x and y are two lists of different length.

The previous query semantics are different from SQL, where a query clause restricts the type of expressions that can appear in some context. For example, the SQL FROM clause restricts the following expression to be a table expression.

Dynamic typing in Q can yield a complicated parser design since a large number of possible parse trees need to be inspected. In the Hyper-Q platform 300, determining a variable type may require a round trip to the PG database for metadata lookup. For example, when a Q query refers a variable x, the parser may need to know if x is a table in the PG database. Due to these considerations, in one embodiment, the parser in the Hyper-Q platform 300 is a lightweight parser whose only role is to create an abstract representation of the query in memory, and delegate the type inference and verification to the binder component. In one embodiment, the parser constructs an AST, comprising the following main elements:

a) literals: constant expressions such as integers (e.g., ii) and symbols (e.g., GOOG).
b) variables: expressions that reference a named entity (e.g., trades).
c) monadic and dyadic operators: operations on one or two arguments, respectively.
d) join operators: different types of Q joins such as the aj operator in Example 2.
e) variable assignments: expressions of the form var: expression.
f)

The AST for Example 2 is shown in FIG. 4, where it is indicated by reference numeral 400. The parser does not attempt to decide on the types of the variable references trades, and quotes since in the general case, they may be expressions of any type.

Binding

In one embodiment, binding may be performed by a binder which may be implemented as a component of the algebrizer 208. After parsing is done, the binder performs semantic analysis of the resulting AST and binds it to XTRA, the internal query representation in the Hyper-Q platform 300. For example, FIG. 4 shows an XTRA tree 402 comprising XTRA expressions to which the AST for Example 2 is bound. Binding Q queries into XTRA expressions is based on the fact that, although Q and SQL data models are different, the vast majority of Q operators can be mapped to corresponding (but sometimes more complicated) relational algebra expressions. The Hyper-Q platform 300 provides an extensible framework to build and compose such mapping rules to achieve the largest possible coverage of the Q language. The framework also allows using more sophisticated methods, such as UDFs in SQL databases, to capture the Q language constructs that cannot be directly mapped to relational algebra expressions. Binding is a recursive operation that is done in a bottom-up fashion, where for each Q operator in the AST, the binder processes the operator's inputs, derives and checks input properties, and then maps the operator to its corresponding XTRA representation in the following way:

g) Literals get bound to scalar const operators xtra_const, where the Q type of the literal is mapped to Hyper-Q's type system. For example, int types get mapped to equivalent integer types, symbol type gets mapped to varchar, whereas string literals get mapped to text constants.
h) Variable references are resolved by looking up their definition through the metadata interface. Table variable references get bound to a relational get operator xtra_get. For example, in FIG. 4, q_var (trades) is bound to xtra_get (trades).
i) When binding each operator, operator's properties are derived in the resulting XTRA tree. For relational operators, derived properties include the output columns with their names and types, keys, and order. For scalar operators, derived properties include the output type and whether the expression has side effects.
j) After binding the inputs of an operator, the binder first checks whether the inputs are valid for the given operator by accessing their properties derived at the previous step. For example, the aj operator expects its two inputs to be table expressions and the right input to be a keyed table. Also, the join columns must be included in the output columns of input operators. If property checking succeeds, the operator is bound to its XTRA representation. In FIG. 4, the aj operator is bound to a left outer join operator that computes a window function on its right input. The results need to be ordered at the end to conform with Q ordered lists model.

Metadata Lookup

In one embodiment, the binder resolves variable references by looking up associated metadata in the metadata store. In the basic case, where Q variables are mapped to PG tables, this corresponds to executing a query against PG catalog to retrieve various properties of the searched object. For tables, the retrieved metadata include columns, keys and sort order, while for functions, the retrieved metadata include function arguments and return type. Q also allows the definition of in-memory variables. A computation result can be stored to a variable that gets referenced in subsequent queries. Consider the following example:

Example 3

Consider the following Q function, which returns max price of trades matching a given symbol Sym:

```
f: { [Sym]
    dt:  select Price from trades where Symbol=Sym;
    :select max Price from dt;
    };
f[GOOG];
```

Example 3 defines a function f, table to variable dt, while applying a filter to Symbol column using the function argument Sym. The function returns the maximum Price in the computed table dt. The last statement in Example 3 calls f while passing the symbol (GOOG) as an argument.

Q distinguishes between two main types of variables: (i) local variables defined in function bodies like dt in Example 3, and (ii) global (server) variables like the function f itself. Local variables are only visible in the scope where they are defined, whereas global variables are visible to all Q query clients connected to the same kdb+ server.

Local variables shadow global variables with the same name. In Example 3, after the program is executed, the function f becomes accessible by any client connected to the server. If f is invoked later in the same session, there is no guarantee that the function definition would still be the same, since it may have been overwritten in the meantime by another query client.

Figure 5:
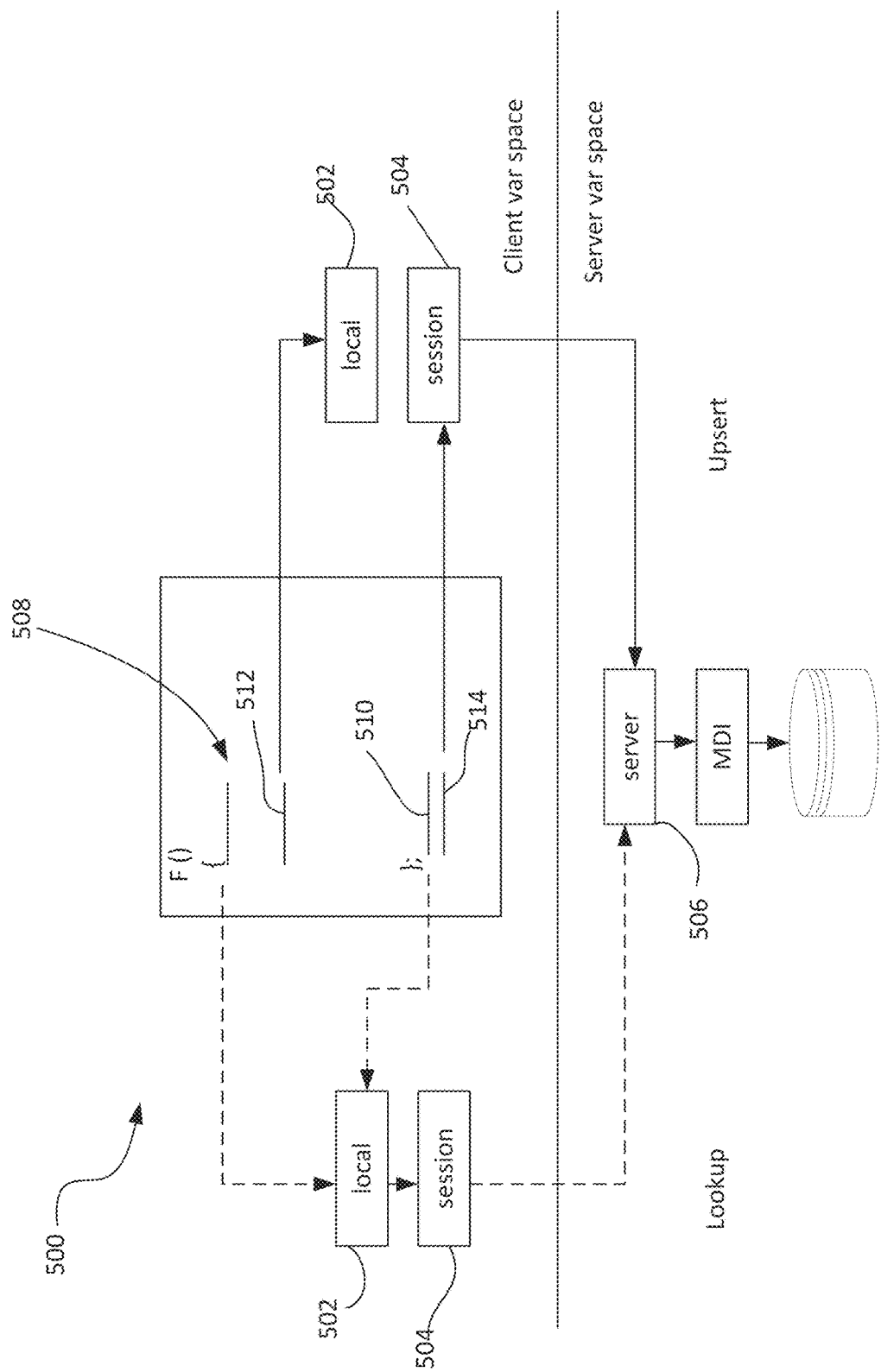
FIG. 5 illustrates a hierarchy of variable scopes, in accordance with one embodiment of the invention.

In one embodiment, the Hyper-Q platform 300 maintains the aforementioned behavior for Q applications. The back-end PG database is used to store and materialize global server variables in publicly accessible schemas. Shadowing of global variables by local variables with the same names is implemented using a hierarchy 500 of variable scopes, as depicted in FIG. 5. The hierarchy 500 has three variable scopes:

1. Local scope 502 stores local function variables.
2. Session scope 504 stores variables defined within session.
3. Server scope 506 stores global variables.

FIG. 5 shows a query session with a function f and two statements outside f. A first statement 508 in f looks up a variable. The lookup has to be performed in the local scope 502 first. If the variable is not locally defined, the lookup operation follows the scopes hierarchy. A first statement 510 outside f also looks up a variable. In this case, the lookup is directed to the session scope 504, since processing is occurring outside the function f. The server scope 506 corresponds to retrieving variable definition, such as tables and functions, through PG MetaData Interface (MDI).

FIG. 5 also shows how variable upsert (definition/redefinition) operation takes place. A second statement 512 in f upserts a variable (e.g., through variable assignment). This upsert call can only be executed in the local scope 502 since, according to Q semantics, local upsert calls never get promoted to higher scopes. The second statement 514 outside f is making another upsert call. In this case, the call is directed to session scope 504. Session variables are promoted to global (server) variables after upsert call is processed. This is done as part of the session scope destruction.

The Xformer Module 310

The Xformer module 310 is responsible for applying transformations to the XTRA expression before serializing it into a SQL query. Transformations are used in the Hyper-Q platform 300 for three main purposes:

1. Correctness. Data models and query languages in kdb+ and PG systems are widely different with implicit assumptions on each side. For example, null values in Q assume 2-valued logic, while in SQL, null values assume 3-valued logic. To bridge this gap in semantics between the two languages, a transformation is used to replace strict equalities in XTRA expressions with Is Not Distinct From predicate, which provides the needed 2-valued logic for null values when serializing the outgoing SQL query.
2. Performance. The XTRA expression holds relational and scalar properties that are used to optimize the serialized SQL. For example, each node in the XTRA tree is annotated with all columns it can produce. The requested columns at each node may be however a small subset of the available columns. A transformation that prunes the columns of each XTRA node, to keep only the needed columns, is used to avoid bloating the serialized SQL with unnecessary columns, which may negatively impact query performance.
3. Transparency. Ordering is a first-class citizen in Q. However, this is not the case in SQL.

To maintain Q ordering semantics in the serialized SQL query, ordering criteria may need to be automatically added to the SQL query constructs generated by the Hyper-Q platform 300. This operation is implemented via a transformation. Each relational XTRA operator can declare an implicit order column and an order preservation property that indicates whether the XTRA operator can preserve the order in its output or not. This property is used by the Xformer module 310 to ignore ordering in some cases. For example, consider a nested query in which the outer query performs a scalar aggregation on the result of the inner query. In this case, the Xformer module 310 can remove the ordering requirement on the inner query. The Xformer module 310 may also generate implicit order columns by injecting window functions in the transformed expressions.

Cross Compiler 314

Figure 6:
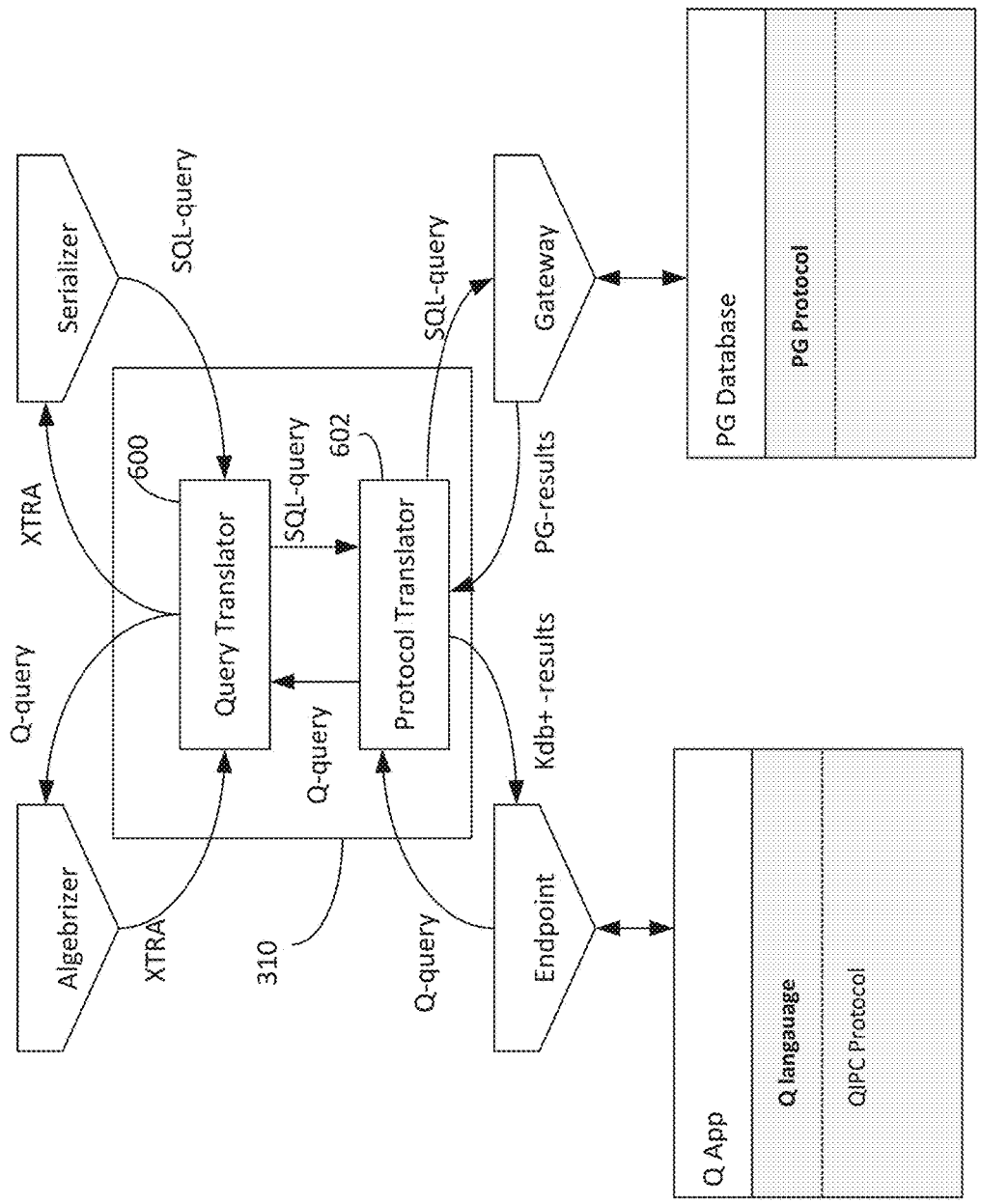
FIG. 6 shows a high-level block diagram of architecture for a cross compiler module, in accordance with one embodiment.

The cross compiler module 314 is responsible for driving the translation of incoming queries written in the Q language into PG SQL, as well as the reverse translation of query results produced by PG database into the result format expected by Q application. FIG. 6 gives an overview of architecture for the cross compiler module 314, in accordance with one embodiment. As will be seen, the cross compiler module 314 comprises a query translator 600 and a protocol translator 602:

The Query Translator 600.

This layer is the query language handler of the Hyper-Q platform 300. In one embodiment, the query translator is responsible for driving the translation of Q queries into XTRA, the internal query representation of the Hyper-Q platform 300, serializing XTRA expressions into equivalent SQL statements, and communicating the generated SQL statements to protocol translator 602 to be sent to the PG database for execution. The query translator 600 communicates with the algebrizer module 308 and the serializer module 312 to perform these tasks.

The Protocol Translator 602.

Generally, a database application is written and configured to execute against a specific database management system. However, there are many cases where it is desirable to have the database application execute against another database management system. In such cases, there is not interoperability between the different database management systems from the point of view of the database application.

This layer is the DB protocol handler of the Hyper-Q platform 300. The protocol translator 602 is responsible for cross translation of messages sent to and received from the two end-point systems (the Q application 302 and the PG database 304). Parsing DB protocol messages to extract queries as well as creating messages that hold queries and query results are handled by this layer.

The interface between the protocol translator 602 and the query translator 600 may be realized by sending out a Q query from protocol translator 602 and receiving back an equivalent SQL query from query translator 600.

The design of cross compiler module 314 abstracts the implementation details of protocol translator 602 and query translator 600 into two separate processes. Each translator process is designed as a Finite State Machine (FSM) that maintains translator internal state while providing a mechanism for code re-entrance. This is particularly important because operations performed by the translators may entail heavy processing, such as serializing large SQL statements or executing PG queries. FSMs allow firing asynchronous events that kick-off backend processing, as well as defining function callbacks that get automatically triggered when events occur. For example, when the results of a PG query are ready for translation, an FSM callback is automatically triggered to process the results and generate the required translation.

In one embodiment, Erlang may be used as the programming language to build the Hyper-Q platform 300. Erlang is a programming environment that combines powerful abstractions of parallel primitives and is natively able to manipulate network traffic, while providing high availability and massive data throughput.

Database Systems Protocols

To communicate with both Q applications and PG databases, the Hyper-Q platform 300 may use several methods to extract information from network messages, package information into messages, and implement process handshake and message flow needed to establish connections with both ends.

In one embodiment, when establishing a connection using QIPC specifications, a client application sends the Hyper-Q platform 300 a null-terminated ASCII string "username: passwordN" where N is a single byte denoting client version. If the Hyper-Q platform 300 accepts the credentials, it sends back a single byte response. Otherwise, it closes the connection immediately. After the connection is established, the client sends queries in the form of raw text. The Hyper-Q platform 300 sends back query result messages encoding both result type and contents. When communicating using PG v3 protocol, the Hyper-Q platform 300 exchanges different types of messages with PG database to handle start-up, query, function call, copy data, and connection shutdown requests. An authentication server is used during connection start-up to support different forms of client authentication such as clear text password, MD5 password, and Kerberos authentication. A PG v3 message starts with a single byte denoting message type, followed by four bytes for message length. The remainder of the message body is reserved for storing contents.

A key point to enable two-way communication between a Q application and PG database is handling the different representations of queries and results in the two protocols. PG v3 protocol allows streaming of query results. An initial message describes the schema of the results. Each row in the results is then transmitted in the following messages. At the end, an end-of-content message is sent. On the other hand, QIPC forms the result set in a column-oriented fashion and sends it as a single message back to the client.

Figure 7:
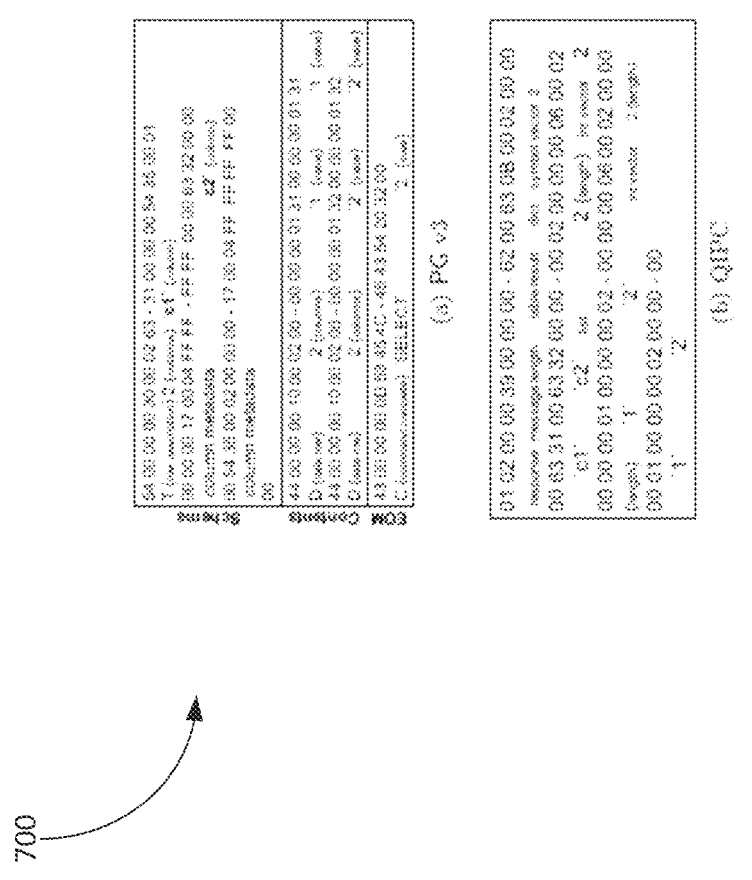

FIG. 7 shows the raw byte representation 700 of a tabular result set, with two columns c1 and c2 and two rows {(1, 1), (2, 2)}, using both QIPC and PG v3 protocols. To send query results back to Q application, Hyper-Q buffers the query result messages received from the PG database until an end-of-content message is received. The results are then extracted from the messages, and a corresponding QIPC message is formed and sent back to the Q application.

The incompatibility of result set formats between QIPC (column-oriented) and PG v3 (row-oriented) poses a challenge when transmitting large data sets: In one embodiment, the Hyper-Q platform 300 buffers the entire result set before it transmits the corresponding QIPC messages. In one embodiment, to overcome this problem the Hyper-Q platform 300 materializes the result set in the PG database (as a temporary table), and then extracts column by column to form the QIPC messages. This problem does not exist when the two end systems use compatible formats, since the Hyper-Q platform 300 can stream the results directly after translation.

Materialization

In one embodiment, the Hyper-Q platform 300 may be configured for early materialization of intermediate results during query cross-compilation. Using Example 3 for illustration, for early materialization, the function f gets interpreted only when it is invoked, e.g., when issuing the query f[GOOG]. When algebrizing the definition of f in the Hyper-Q platform 300, the function definition is stored as plain text in the current variable scope. When f is invoked, the textual definition is retrieved from the current variable scope and it gets algebrized.

The first statement of f assigns a computed table to an in-memory variable dt. Before algebrizing the rest of the function's body, the definition and metadata of dt must be stored in the current variable scope, so that the following statements that refer to dt can be successfully algebrized. In general, a Q variable assignment statement may need to be physically executed before algebrizing the following statements. The reason is that a variable assignment in Q could have side effects (e.g., modifying other tables). In the Hyper-Q platform 300, materialization of Q variables into PG objects may need to be done in situ to maintain a behavior consistent with the behavior of Q applications with kdb+.

The previous semantics may trigger the need to implement early materialization of Q variables into PG objects during query translation. In some cases, only logical materialization (e.g., using PG views, or maintaining the variable definition for scalar variables in Hyper-Q's variable store) is sufficient. In other cases, physical materialization (e.g., using temporary PG tables) is necessary for correctness. To illustrate, the Hyper-Q platform 300 generates the following SQL queries when translating the Q query f[GOOG] in Example 3 using the physical materialization approach:

```
CREATE TEMPORARY TABLE HQ_TEMP_1 AS
SELECT ordcol, Price FROM trades
WHERE Symbol IS NOT DISTINCT FROM  GOOG  ::varchar
ORDER BY ordcol;
SELECT  1   ::int AS ordcol, MAX(Price)
FROM HQ_TEMP_1 ORDER BY ordcol;
```

Note that in the presence of variable assignment multiple Q statements may be folded into a single SQL statement, where each variable reference is replaced by its definition.

Having described the Hyper-Q platform 300, same features and advantages of a generalized virtualized data processing system, within the scope of the present invention, to facilitate database impersonation will now be provided:

Normalizations & Optimizations

Normalizations may include but are not limited to a canonical representation of predicates, e.g., in conjunctive normal form, separation of scalar computation and aggregate expression, etc. the inventive system converts each incoming statement into a normalized representation, i.e., the system eliminates insignificant syntactic differences in otherwise equivalent query texts. Examples include elimination of insignificant digits in time stamps. Normalizations ensure subsequent optimizations (see below) can be applied uniformly not only if the query was written in a specific way.

Optimizations may include elimination of unneeded request components, i.e., sub-commands that do not contribute to the final result nor change the state of the target database system alteration of the order of command components to enable efficient re-use of previously computed results etc. In one embodiment, the inventive system may perform optimizations to avoid unnecessary computation, or replace more expensive operations with more cost-effective ones. For example, consider the following Q query:

count select from trades where time>12:00:00.0

In SQL, this query may be have the following equivalent form:

```
SELECT
    "TAB8" . "ordcol" AS "ordcol" ,
    "TAB8" . "COUNT" AS "COUNT"
FROM
    (SELECT
        '1': : int AS "ordcol" ,
        COUNT ('1': : int ) AS "COUNT"
    FROM
        (SELECT
            *
        FROM
            "public" . "trades" "TAB2"
        WHERE
            ("TAB2" . "Time" > '12:00:00.000000': :time )
        ) AS "TAB5"
    ) AS "TAB8"
ORDER BY
    "ordcol"
```

In above example, the computation of the order of the resulting data set is short cut to be a constant (1) as the system recognizes the query will generate only a single row. So, instead of computing the row number for the output data row as the minimum of row numbers of all rows, the system generates query text that is capable of computing an equivalent, though not necessarily equal, row number.

Abstracting Data Processing Engine

In one embodiment, the inventive system may be configured to allow applications to run against any database in the enterprise, and hence integrate large amounts of data, without having to rewrite it. The system enables migrating off a source DBMS and replacing it with instances of a target DBMS, e.g., for better performance, scalability, pricing, etc. without having to modify applications, therefore without disruption of business. The system may be used to transfer the content of an instance of the source DBMS into an instance of the target DBMS by (i) retrieving and (ii) subsequently storing of all data and metadata using an application written using only protocol/language of the source DBMS. By directing the operations of (ii) via the system all commands/data get automatically translated and transferred into the new instance of the target DBMS.

Abstracting Authentication Mechanisms

In one embodiment, the system enables applications to use the source database authentication mechanisms while the target database is effectively used as a backend to run queries and retrieve results. This is realized by implementing the source database authentication mechanisms using one or more authentication mechanism provided by the target database. The source application operates without modifications whereas a potentially different authentication mechanism could be used internally by the system.

Example a. The source application uses Kerberos authentication mechanism when communicating with the database, while the target database only uses clear text password authentication b. The system can utilize the user's credentials to authenticate with a pre-configured Kerberos server maintained by the system.

c. Once authentication succeeds, the password authentication mechanism is used to authenticate the user application again against the target database.

d. Eventually, the user application succeeds in obtaining an authenticated connection to the target database, created by cascading one or more authentication mechanisms internally.

From the source application's perspective, the process of user authentication remains unchanged, even though an authentication mechanism, potentially different from the source application's authentication mechanism, is used internally by the system. Providing this layer of abstraction around user authentication mechanism bridges the gap in functionalities between the source application and target database. The source application still communicates natively with the target database, even when the target database does not provide the authentication mechanism needed by the application. When such mismatch in functionality exists, the system acts as an intermediate coordinator that effectively hides this mismatch.

Emulating the Query Language of Source Application Against Target Database

In one embodiment, the system bridges the gap in the query languages and data models adopted by the source application and target database. Since the source application is designed to work with a particular source database, the query language features and data model of the source database could be arbitrarily utilized by the source application. However, the query language and data model of the target database could be widely different from the source database. The difference ranges from slight syntactic discrepancies to completely different data and query models.

The system allows the source application to run unmodified while working with a database different from the one that the application was designed for. In order to allow the source application's query statements to run against a new target database, each query statement goes through a sophisticated query transformation engine maintained internally by the system.

The transformation engine emits an equivalent query statement that conforms to the syntactic rules and data model of the target database system. Moreover, the system guarantees that when executing the generated statement, the returned results exactly match the results of executing the source statement against the source database, in terms of both values and binary representation on the wire.

The source application might also issue query statements that rely on advanced features of the source database query language, while no equivalent features may be available in the target database. In this case, the system breaks down the advanced query statement into multiple smaller statements that can be individually executed by the target database. The system maintains and monitors the execution of these smaller statements and uses their individual results collectively to obtain the final query results from the target database.

Example a. A stored procedure is a collection of query and control flow statements. For example, the following procedure defines a simple loop that inserts tuples in a given table based on the value of the given parameter (I):

```
CREATE PROCEDURE PROC_INSERT (IN I INTEGER)
BEGIN
   DECLARE C INTEGER DEFAULT 0;
   WHILE C <= 5 DO
   INSERT INTO T(col) VALUES (I+C) ;
   SET C = C + 1;
      END WHILE;
   END;
```

The previous procedure could be defined by the source application, and then invoked using a command similar to
CALL PROC_INSERT(10);

b. When executing the previous procedure call command, the following tuples are inserted into table T:
(10), (11), . . . . (15)

c. When stored procedures are supported by the source database, but not supported by the target database, an application that relies on using stored procedures, similar to the example above, cannot run natively against the target database.

d. The mismatch in functionality between the two systems can be arbitrarily big based on the complexity of the stored procedure definition. Stored procedures language involves complex control flow constructs including loops, conditional statements, nested procedure calls, recursion, exception handling, and transactional semantics.

e. The system allows the source application to run against a new target database by acting as an intermediate coordinator that breaks the definition of complex stored procedure into smaller query statements, and implements the control flow needed to bind the results of the individual statements internally.

f. In the previous example, the system unwraps the previous procedure into multiple smaller statements

```
INSERT INTO T (col) VALUES (10);
INSERT INTO T (col) VALUES (11);
...
INSERT INTO T (col) VALUES (15) ;
``` g. Each statement goes through the system's query translation stack to generate an equivalent statement that can run natively against the target database.

h. The system sends these smaller statements one by one to the to the target database and monitors their execution status i. When the execution of all statements is done, the system returns back a success message to the source application.

j. If strict transaction semantics are required when running the stored procedure, the system can start a new transaction before sending the first query statement, and commits the transaction after the last statement execution is complete. If an intermediate statement fails, the effects of all previous statements are rolled-back.

k. In this example, the capabilities of the underlying database are completely abstracted by the system. The system provides the application exactly the same behavior of the original database, while effectively using a different database.

Other query translation systems may translate complex query constructs from one query language to another in an offline static fashion. This approach does not work if there is a need for using the intermediate query results to influence the construction of subsequent statements. For example, if a stored procedure inserts values in a table based on the data in another table, an offline query translator cannot generate a correct translation, since the state of the database during query execution needs to be taken into account while translating the individual statements. The proposed system handles this scenario by interleaving query translation and query execution and monitoring the state of the database while query execution is in progress, providing a full-fledged solution that handles complex query constructs.

Caching Object Definitions and Query Results

In one embodiment, the system caches metadata describing the definitions of accessed data objects to cut down the time needed to obtain these definitions from the target database in subsequent queries. The cached objects include table, index and function definitions. When an incoming query uses any of these objects, the system needs to verify that the query matches the object definition. For example, the query does not attempt to access to non-existing table.

While metadata lookup operation can always be delegated to the target database system, it incurs additional overhead to verify the object definitions by always contacting the target database. As an alternative, the object definition could be cached in memory in a data structure maintained by the system. All queries are verified against the metadata cache before they are processed by the system.

The cache can be configured by the system user based on different parameters including time-to-live and query type. Based on cache configurations, the cached objects might be invalidated. For example, when dropping a table in the target database, the corresponding cached table definition is not valid anymore and needs to be removed from the cache. The mechanism that the system uses to perform cache eviction can be configured by the system user. For example, for read-only query workloads, the cache can remain valid throughout the execution of the whole workload. On the other hand, for read/write workload, the cache could be invalidated when the first update/delete command is encountered.

The caching mechanisms used by the system are also used to cache query results. When a query first comes in, the system generates an equivalent query to be executed on the target database. When the query results are retrieved, the system caches the results into an in-memory data structure used for query results caching. When the same query is received by the system, the cached query results can be immediately returned to the application with re-executing the query in the target database.

Customized Object Mapping

In one embodiment, the system provides automated mapping capabilities that replaces references to data objects in the queries generated by the source application with references to the corresponding objects in the target database. The referenced objects include schemas, tables, columns, functions and stored procedures. The system allows users to define customized mapping schemes that are used in runtime to automatically rewrite the references to data objects and maintain the correctness of query results.

Example a. Consider for example a built-in function F1 used by the source application that has an equivalent function F2 in the target database.
b. When a query generated by the source application references F1, the system recognizes this reference and looks up the pre-configured mappings of F1, if any exists.
c. If a mapping (F1->F2) is defined, the system obtains the definition of function F2 and verifies that the mapping is viable. For example, both functions have the same number and types of arguments.
d. If the mapping is viable the system automatically rewrites the source application query to reference F2 instead of F1.

The mapping mechanism can also be used to perform schema mapping. For example, when column(s) referenced by queries in the source application have equivalent column(s) (with potentially different names) in the target database, the system can automatically rewrites all references of the source columns to references of the target columns. The mapping rule can be arbitrarily complex by defining mapping logic to be executed when rewriting the data processing operations in the query.

Example a. Assume that the column FullName referenced by the source application needs to be mapped to a pair of columns (FirstName, LastName) in the target database.
b. The mapping logic could be defined as concatenating column values.
c. When a query that references FullName is recognized by the system, the column reference is replaced by the concatenation of the pair (FirstName, LastName).
d. Any data processing operation in the incoming query that manipulates FullName is replaced by an equivalent operation that manipulates the concatenation of (FirstName, LastName).

Modifying Application Queries Using Third-Party Tools users to attach third-party tools to the system for the purpose of modifying/rewriting application queries before they are translated by the system. For example, the queries generated by application could contain snippets that are not needed for a particular business process. The execution of full queries may be undesired as it unnecessarily increases the load on the target database. The system allows users to hook third-party tools/scripts to the system so that they can filter the incoming queries by removing unwanted snippets. The resulting filtered query is processed by the system as usual to generate an equivalent query that can run against the target database.

Fire Walling and Admission Control

In one embodiment, the system can be configured to perform query filtering based on user specified criteria. This capability allows the system to provide fine-grained access control beyond what a typical database system provides. For example, the system can be configured to run third party tools/scripts that analyze the incoming queries and determine, based on user privileges, whether the query should be admitted to the system or not.

The system also provides built-in access control capabilities that filter the queries based on the types of data objects they access. For example, the system can be configured to prevent all access to a particular function or table if the user is not in a given user group. The built-in access control can also be configured based on query types and patterns. For example, all queries inserting data to a particular target table by reading from a particular source table could be banned. When the system authenticates the incoming user connection, it loads all access control rules applicable to the user. During the life-time of the application, the access control rules are constantly checked when receiving each query to determine whether the incoming query should be admitted or not.

Extending the Functionalities of Target Database System

In one embodiment, the system can utilize extensibility features of the target database system to extend the functionalities and query language features supported by the target database system. For example, if the target database system allows creating user defined functions and stored procedures, the system can build on these constructs to implement new analytical query features that are not natively supported by the target database system.

Example a. Assume that the target database system does not have support to a particular time series analytical function, but provides a toolbox for building user defined functions in a given programming language.
b. A user-defined function that computes the required time-series analytical function is implemented offline and added to the target database system toolbox.
c. New query transformation rules are implemented in the system to replace the references of time series analytical function to calls of the created user-defined function. The system provides a principled and verifiable mechanism to implement such transformations by matching query patterns and verifying the derived properties of different query constructs.
d. In general, such transformations could be complex and they may require combining multiple constructs in the context where time-series analytical function is used. Performing this operation manually can be both difficult and error-prone.
e. Incoming queries are automatically transformed to use the new user-defined function. Applications that include the time series analytical function become automatically supported by the target database system.

The extensibility features of the target database system provide a toolbox that the system can utilize to bridge the gap in functionalities between the source and target database systems. By leveraging such toolbox, the system can efficiently translate queries originating from the source application into target database queries that utilize the toolbox to provide the needed functionality.

Mapping Transactional Semantics

In one embodiment, the system can be used to map the transactional semantics of the source application to equivalent transactional semantics of the target database. The source application could declare as part of its configurations the transactional semantics and isolation level to be applied to its query workload. These settings could be specified as part of the initial message handshake with the system. The system can use these configurations to identify mappings to the transactional semantics and isolation levels supported by the target database. The system also allows user to explicitly specify these mappings to maintain the required application behavior.

In one embodiment, the source application could declare an implicit transactional mode in which each outgoing query is treated as a standalone transaction. Alternatively, the source application could declare an explicit transactional mode in which data updates are not made persistent in the database without issuing an explicit commit command. The system can detect the configured transactional mode and automatically rewrite the outgoing queries to use the query language constructs of the target database so that queries execute in the target database while maintaining the required application behavior. For example, if the target database does not natively provide an implicit transactional mode, each translated query needs to be enclosed within transaction boundaries to maintain the required application behavior. The system provides this automatic translation by generating begin-transaction and end-transaction constructs, specified using the query language of the target database, around each translated query.

Migrating Physical Schemas

In one embodiment, the system migrates the physical schema of the source database into an equivalent schema in the target database. When the source schema is given in the form of data definition language (DDL) commands, the system utilizes the query translation stack to generate data definition commands in the query language of the target database. When there are unclear or ambiguous mappings between the constructs used in the source database schema and the equivalent constructs in the target database language, the system allows user to explicitly define the required mappings as part of the system configurations. When the system encounters query constructs that do not have one to one mapping to the target database language, the system allows user to provide feedback on the required mappings to be used when generating the target database schema.

Figure 8:
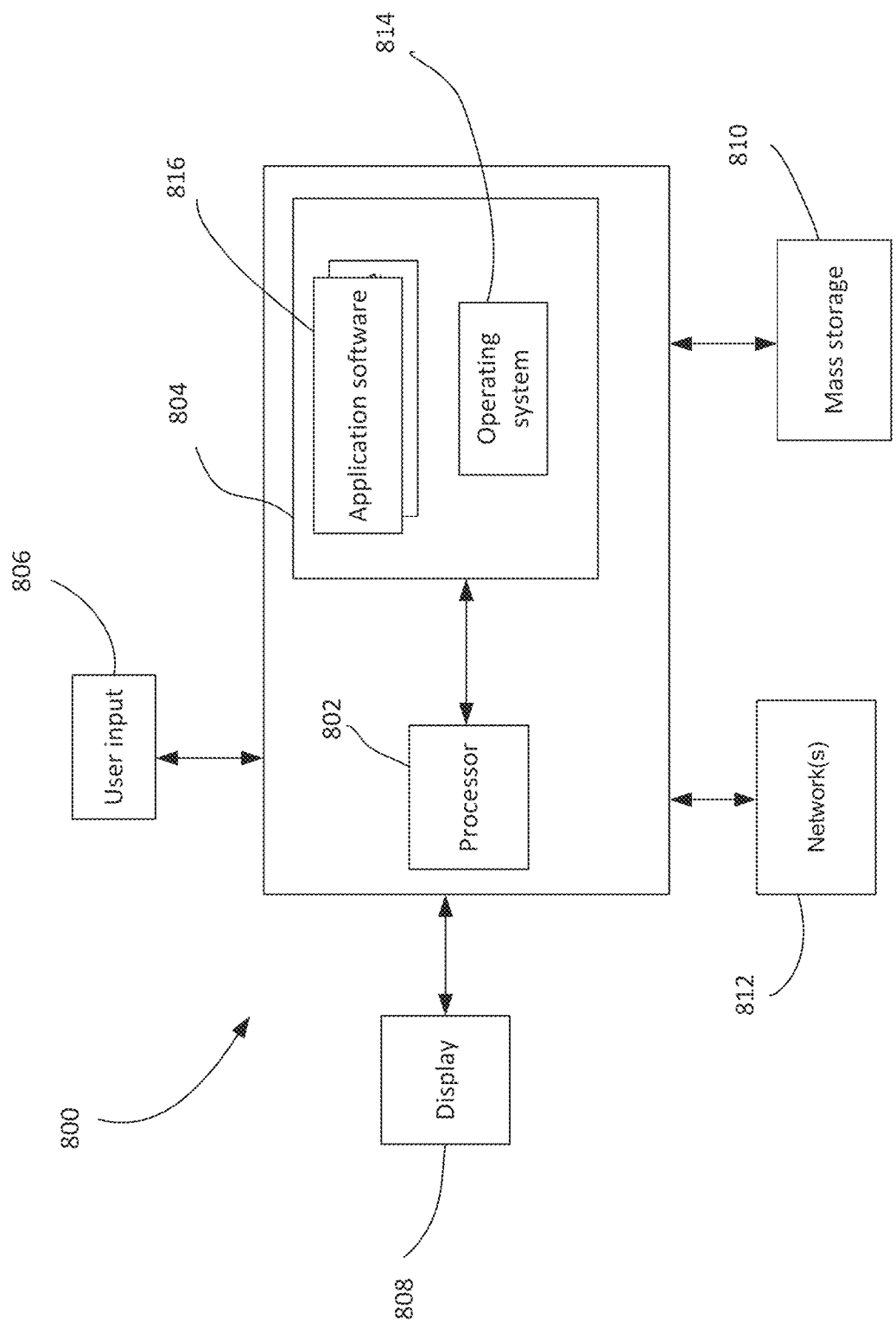
FIG. 8 shows a high-level block diagram of exemplary hardware that may be used to implement the virtualized data processing system, in accordance with one embodiment.

FIG. 8 shows an example of hardware 800 that may be used to implement the virtualized data processing system 208, in accordance with one embodiment. The hardware 800 may include at least one processor 802 coupled to a memory 804. The processor 802 may represent one or more processors (e.g., microprocessors), and the memory 804 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 804 may be considered to include memory storage physically located elsewhere in the hardware, e.g. any cache memory in the processor 802, as well as any storage capacity used as a virtual memory, e.g., as stored on a mass storage device.

The hardware also typically receives a number of inputs and outputs for communicating information externally. For interface with a user or operator, the hardware may include one or more user input devices 806 (e.g., a keyboard, mouse, etc.) and a display 808. For additional storage, the hardware 800 may also include one or more mass storage devices 810, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 812 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 712 and each of the components, as is well known in the art.

The hardware 800 operates under the control of an operating system 814, and executes application software 816 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method for providing interoperability between a plurality of database management systems, the method comprising:
   in a server communicably connected to a plugin-application:
     receiving, from a source application, a connection request;
     intercepting communications issued by the source application to a source database management system; and
     responsive to said intercepted communications, impersonating the source database management system as a target database management system,
   wherein the intercepting of the database management system communications comprises intercepting off a wire protocol associated with the source application.

2. The method of claim 1, wherein impersonating the source database management system comprises, for each detected database management system communication, constructing an equivalent form for processing by the target database management system; and
   sending said equivalent form to the target database management system for further processing.

3. The method of claim 2, wherein constructing said equivalent form of a database management system communication comprises constructing intermediate representation of said communication.

4. The method of claim 3, wherein said intermediate representation is based on a relational algebra.

5. The method of claim 3 further comprising performing a normalization operation to normalize said intermediate representation.

6. The method of claim 5 further comprising performing at least one optimization operation on the intermediate representation to eliminate unneeded components.

7. The method of claim 2, wherein said equivalent form conforms to the syntactic rules and data model of the target database management system.

8. The method of claim 2, further comprising caching metadata describing the definitions of accessed objects from the target database management system to improve a speed of constructing said equivalent form.

9. The method of claim 2, wherein said data objects are selected from the group consisting of schemas, tables, columns, functions, and stored procedures.

10. The method of claim of claim 2, wherein each intercepted communication comprises an original query, the equivalent form of which comprises a translation of said original query for processing by the target database management system.

11. The method of claim 10, wherein said original query is translated into a plurality of semantic objects of a query language of the target database management system in order to overcome limitations of said query language.

12. A method for providing interoperability between a plurality of database management systems, the method comprising:
in a server communicably connected to a plugin-application:
receiving, from a source application, a connection request;
intercepting communications issued by the source application to a source database management system;
responsive to said intercepted communications, impersonating the source database management system as a target database management system; and
performing an authentication procedure in cases where the source database management system and the target database management system maintain different authentication schemes, wherein for any communication issued by the source application to the source database management system, requiring authentication by the source database management system, performing the authentication procedure comprises performing at least one bridging authentication operation wherein (1) said communication is authenticated against a bridge authentication mechanism based on user credentials obtained from said communication, and (2) said communication is subsequently authenticated with the target database management system by using the user credentials.

13. A method for providing interoperability between a plurality of database management systems, the method comprising:
in a server communicably connected to a plugin-application:
receiving, from a source application, a connection request; intercepting communications issued by the source application to a source database management system; and
responsive to said intercepted communications, impersonating the source database management system as a target database management system,
wherein impersonating the source database management system comprises, for each detected database management system communication, (i) constructing an equivalent form for processing by the target database management system and (ii) sending said equivalent form to the target database management system for further processing,
wherein constructing said equivalent form comprises automatically replacing references to data objects in a query contained in said communication with references to corresponding objects from the target database management system.

14. A method for providing interoperability between a plurality of database management systems, the method comprising:
in a server communicably connected to a plugin-application:
receiving, from a source application, a connection request;
intercepting a plurality of communications issued by the source application to a source database management system; and
responsive to said intercepted communications, impersonating the source database management system as a target database management system by constructing, for each detected database management system communication, an equivalent form for processing by the target database management system, and sending each equivalent form to the target database management system for further processing,
wherein each intercepted communication comprises an original query, the equivalent form of which comprises a translation of said original query for processing by the target database management system,
wherein said translation comprises a one-to-one mapping between the original query and an equivalent query in the translation.

15. A method for providing interoperability between a plurality of database management systems, the method comprising:
in a server communicably connected to a plugin-application:
receiving, from a source application, a connection request;
intercepting a plurality of communications issued by the source application to a source database management system; and
responsive to said intercepted communications, impersonating the source database management system as a target database management system by constructing, for each detected database management system communication, an equivalent form for processing by the target database management system, and sending each equivalent form to the target database management system for further processing,
wherein each intercepted communication comprises an original query, the equivalent form of which comprises a translation of said original query for processing by the target database management system, wherein said original query is translated into at least one query in a query language of the target database management system based on originally referenced objects in said original query.

16. A method for providing interoperability between a plurality of database management systems, the method comprising:
   in a server communicably connected to a plugin-application:
      receiving, from a source application, a connection request;
      intercepting a plurality of communications issued by the source application to a source database management system; and
      responsive to said intercepted communications, impersonating the source database management system as a target database management system by constructing, for each detected database management system communication, an equivalent form for processing by the target database management system, and sending each equivalent form to the target database management system for further processing,
   wherein each intercepted communication comprises an original query, the equivalent form of which comprises a translation of said original query for processing by the target database management system,
   wherein said original query is translated into at least one query in a query language of the target database management system based on additionally created objects.

17. A method for providing interoperability between a plurality of database management systems, the method comprising:
   in a server communicably connected to a plugin-application:
      receiving, from a source application, a connection request;
      intercepting a plurality of communications issued by the source application to a source database management system; and
      responsive to said intercepted communications, impersonating the source database management system as a target database management system by constructing, for each detected database management system communication, an equivalent form for processing by the target database management system, and sending each equivalent form to the target database management system for further processing,
   wherein each intercepted communication comprises an original query, the equivalent form of which comprises a translation of said original query for processing by the target database management system,
   wherein said original query is translated into at least one query in a query language of the target database management system based on data types that matched the original query.

18. A method for providing interoperability between a plurality of database management systems, the method comprising:
   in a server communicably connected to a plugin-application:
      receiving, from a source application, a connection request;
      intercepting a plurality of communications issued by the source application to a source database management system; and
      responsive to said intercepted communications, impersonating the source database management system as a target database management system by constructing, for each detected database management system communication, an equivalent form for processing by the target database management system, and sending each equivalent form to the target database management system for further processing,
   wherein each intercepted communication comprises an original query, the equivalent form of which comprises a translation of said original query for processing by the target database management system,
   wherein said original query is translated into at least one query in a query language of the target database management system based on alternative types not found in the original query.

* * * * *